United States Patent
Herzberg

(10) Patent No.: US 9,073,460 B2
(45) Date of Patent: Jul. 7, 2015

(54) ROAD FINISHER AND SEAT CONSOLE

(71) Applicant: JOSEPH VOEGELE AG, Ludwigshafen/Rhein (DE)

(72) Inventor: Ingo Herzberg, Angelbachtal (DE)

(73) Assignee: JOSEPH VOEGELE AG (DE)

( * ) Notice: Subject to any disclaimer, the term of this patent is extended or adjusted under 35 U.S.C. 154(b) by 0 days.

(21) Appl. No.: 13/860,607

(22) Filed: Apr. 11, 2013

(65) Prior Publication Data

US 2013/0270888 A1    Oct. 17, 2013

(30) Foreign Application Priority Data

Apr. 12, 2012   (DE) ...................... 20 2012 003 697 U

(51) Int. Cl.
| | |
|---|---|
| B60N 2/38 | (2006.01) |
| B60N 2/14 | (2006.01) |
| B60N 2/24 | (2006.01) |
| E01C 19/48 | (2006.01) |

(52) U.S. Cl.
CPC ....... B60N 2/38 (2013.01); B60N 2/146 (2013.01); B60N 2/24 (2013.01); E01C 19/48 (2013.01); *E01C 2301/30* (2013.01)

(58) Field of Classification Search
CPC ............. B60N 2/38; B60N 2/24; B60N 2/146
USPC ................... 296/65.01; 297/463.1; 180/329
See application file for complete search history.

(56) References Cited

U.S. PATENT DOCUMENTS

| | | | |
|---|---|---|---|
| 1,524,128 A | 1/1925 | Grimm | |
| 2,306,891 A | 12/1942 | McArthur | |
| 2,715,433 A * | 8/1955 | Dolgorukov | ................ 297/344.1 |
| 3,963,132 A | 6/1976 | Dufour | |
| 4,588,226 A * | 5/1986 | Young et al. | ............. 297/344.24 |
| 4,703,568 A | 11/1987 | Theurer et al. | |
| 6,302,483 B1 * | 10/2001 | Ricaud et al. | ............ 297/344.24 |
| 6,814,174 B2 * | 11/2004 | Fluent et al. | .................. 180/329 |

FOREIGN PATENT DOCUMENTS

| | | |
|---|---|---|
| DE | 1153645 B | 8/1963 |
| DE | 2507168 A1 | 9/1976 |
| DE | 8532254 U1 | 3/1987 |
| DE | 3540486 A1 | 5/1987 |
| DE | 3246593 C2 | 1/1992 |
| DE | 29612035 U1 | 9/1996 |

(Continued)

OTHER PUBLICATIONS

Extended European Search Report Dated Jul. 9, 2013, Applicant Joseph Voegele AG, Application No. 13001746.0-1758, 6 Pages.

(Continued)

*Primary Examiner* — Glenn Dayoan
*Assistant Examiner* — Melissa A Black
(74) *Attorney, Agent, or Firm* — Brooks Kushman P.C.

(57) ABSTRACT

A road finisher includes an operator's seat arranged on a seat console. The seat console is adjustable on an operator's stand platform between different, locked working positions, namely by means of a locking device with a lock bolt which is shiftable between a disengaged position and an engaged position relative to at least one bolt receptacle. The lock bolt is shiftable by means of a movably mounted pivot lever which comprises at least one actuating end with at least one foot pedal and a shifting end acting on the lock bolt.

16 Claims, 4 Drawing Sheets

(56) References Cited

FOREIGN PATENT DOCUMENTS

| | | |
|---|---|---|
| DE | 202004009683 U1 | 9/2004 |
| DE | 202011105309 U1 | 10/2011 |
| GB | 2088296 A | 6/1982 |

OTHER PUBLICATIONS

German Search Report Dated Jun. 1, 2012, Applicant Joseph Voegele AG, Application No. 20 2012 003 697.1. 5 Pages.

* cited by examiner

ROAD FINISHER AND SEAT CONSOLE

CROSS-REFERENCE TO RELATED APPLICATIONS

This application claims foreign priority benefits under 35 U.S.C. §119(a)-(d) to German patent application number DE 20 2012 003 697.1, filed Apr. 12, 2012, which is incorporated by reference in its entirety.

TECHNICAL FIELD

The disclosure relates to a road finisher and to a seat console.

BACKGROUND

It is known from the product program 2008, registration number 2096421 DE/06.08, pp. 16, 22, 24, 44 and 51 (Internet: www.voegele.info) of the company Joseph Vögele AG, Neckarauer Straβe 168-288, 68146 Mannheim/Del., to shift the operator's seat mounted on the seat console with the seat console between different working positions in a rotary bearing, e.g., orient it in the driving direction of the road finisher, or pivot it outwardly beyond the lateral boundary of the road finisher. The respective working position is locked by a lock bolt arranged in the seat console, by the engagement thereof with a lock bolt receptacle. The lock bolt is manually relocated from the engaged position into the disengaged position and, after the seat console was adjusted, brought back into the engaged position by its own weight and/or manually. The lock bolt is often jammed, for instance because of its weight and the engagement, and difficult to handle by the operator in terms of ergonomics. If the road finisher stands on a slope and/or is laterally inclined the mass of the seat console with the operator's seat represents a load on the engaged lock bolt, so that same is only very hard to disengage. Also dirt may cause the jamming of the lock bolt. The manual operation is associated with the risk of bruising and injury. Also, the seat console with the operator's seat, if applicable with an operating console, may be displaced on the operator's stand platform in the transverse direction of the road finisher.

DE 35 40 486 A relates to a device for pivoting an individual seat of a motor vehicle about a pivot axis which is stationary on the ground, and for locking the individual seat in different pivot positions. A mandrel adjustable between an engaged position and a disengaged position by a hand-operated lever locks the individual seat in the respective pivot position. The mandrel is offset at the upper end, and has an eye in the offset with which the hand-operated lever engages. The hand-operated lever is bent in an L-shaped manner and can be adjusted about a pivot axis against the force of a spring. If a force acts on the mandrel in the pivot direction, or if the motor vehicle is tilted, it is difficult to move the mandrel by means of the hand-operated lever, which deteriorates the operational comfort of the device.

SUMMARY

An object of the disclosure is to provide a road finisher and a seat console which are more user-friendly and more favorable with respect to the ergonomics of the operator's seat adjustment.

The pivot lever in the road finisher fulfills multiple functions as it comprises the foot pedal at a well accessible position at the actuating end at least for shifting the lock bolt from the engaged position into the disengaged position and allows by means of its lever action great shifting forces to be applied to the lock bolt with a moderate actuating force, so that the lock bolt can also be shifted into the disengaged position with one foot in a reliable and comfortable manner, even if it is jammed.

The seat console is characterized by a clearly improved operability during an adjustment, by reduced forces even if the lock bolt is jammed, and by enhanced ergonomics. Moreover, the operation of the pivot lever by its foot pedal is very obvious, i.e., possible without deliberations by an operator. The foot pedal allows the application of substantially greater forces than a hand, as an operator not only applies a force, but can use at least a portion of his body weight.

Preferred embodiments of the road finisher and the seat console are described in the dependent claims.

An embodiment of the subject matter of the disclosure is explained by means of the attached drawings.

DETAILED DESCRIPTION

Figure 1:
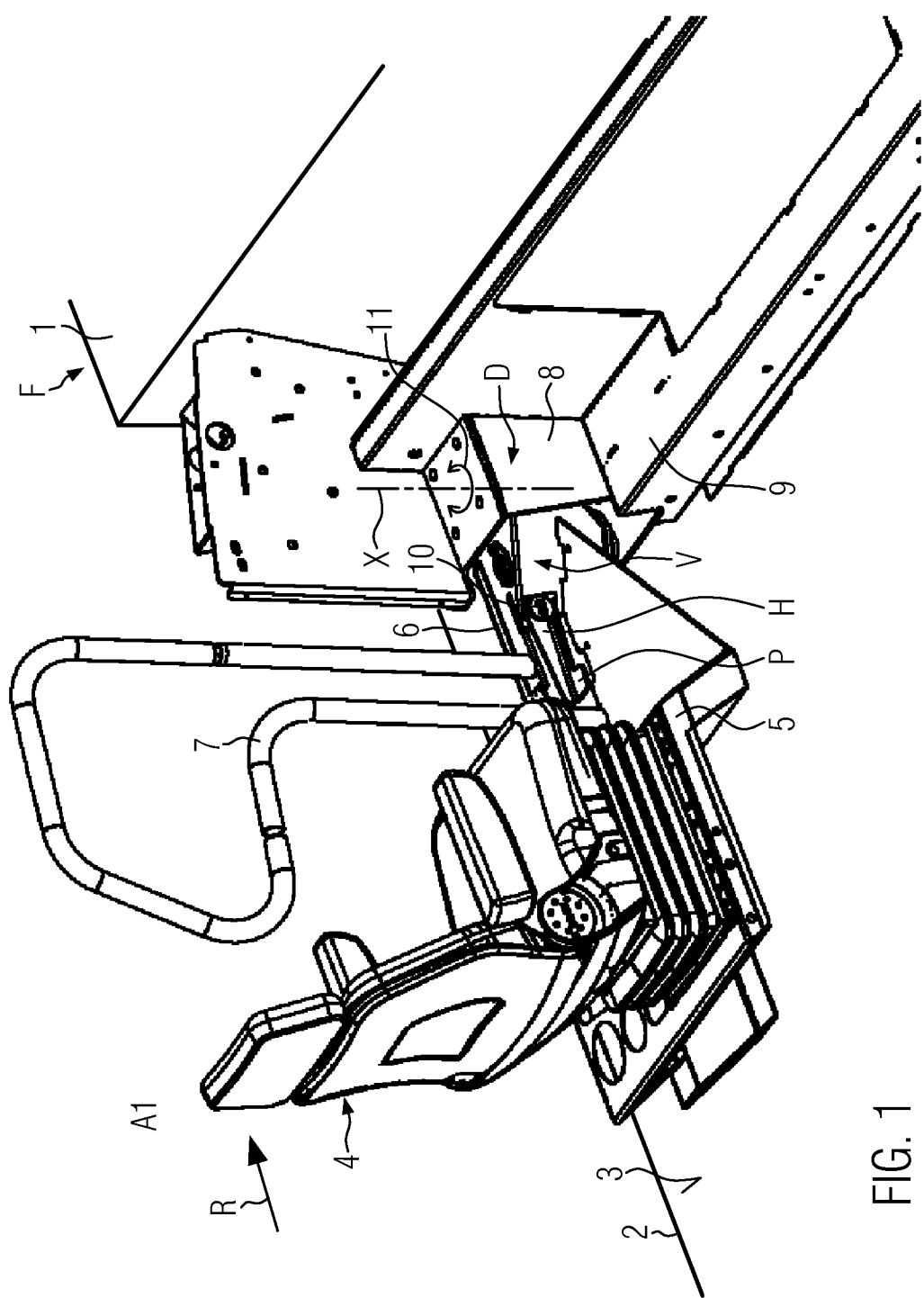
FIG. 1 shows a perspective view of a part of an operator's stand platform of a road finisher with an operator's seat in a working position.
Figure 2:
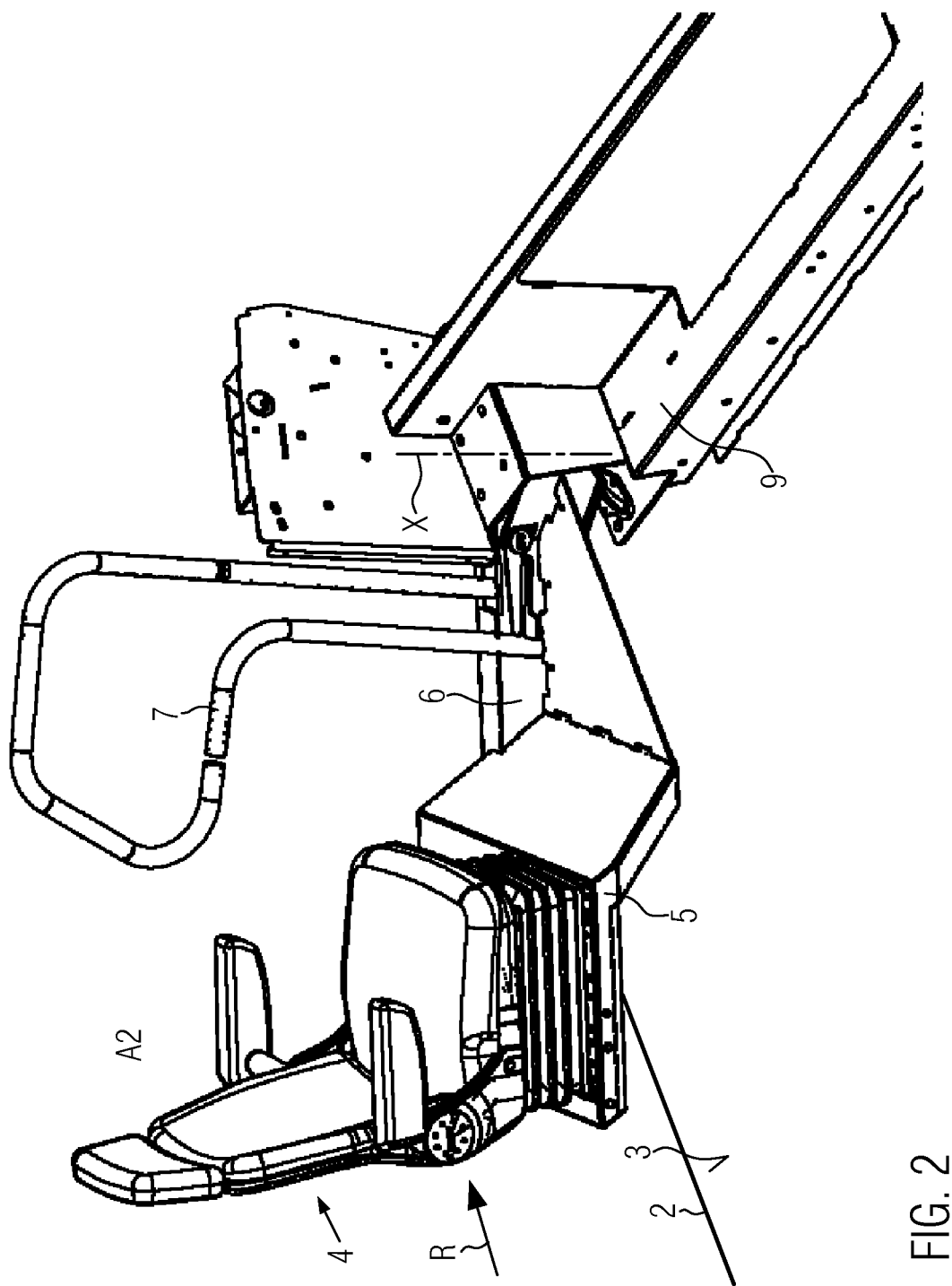
FIG. 2 shows a view similar to the one of FIG. 1, with the operator's seat in a different working position.

FIGS. 1 and 2 show an operator's seat 4 on an operator's stand platform 3 of a chassis 2 of a road finisher F, for instance behind a primary drive aggregate 1. The operator's seat 4 is shown in a first working position A1, and is part of a control platform not shown in more detail. The seat 4 is approximately oriented forwards in the driving direction R of the road finisher F and is located, for instance, within the width of the operator's stand platform 3. In FIG. 2 the operator's seat 4 is pivoted outwardly into another, e.g., second working position A2, so that it projects over the lateral boundary of the operator's stand platform 3 and has a diagonal orientation with respect to the driving direction R. Where necessary, the operator's seat 4 may be brought into more than two, other predetermined working positions.

The operator's seat 4 is arranged on a seat console 5 and, if applicable, has thereon other adjustment possibilities that are not shown in more detail. The seat console 5 can be pivoted by a seat console cantilever structure 6 in a rotary bearing D, e.g., in the direction of a double arrow 11, about an axis X which is approximately vertical relative to the operator's stand platform 3, and is locked in the working positions, e.g., A1 and A2, by means of a locking device V. A lateral safety bar 7 may be mounted on the seat console 5 and/or the seat console cantilever structure 6, which moves along with the adjustment motions of the seat console 5. The rotary bearing D is installed stationarily relative to the operator's stand platform 3 in a box-like holder 8, for instance adjacent to a lateral structure 9. To actuate the locking device V a pivot lever H is provided, which is pivotably mounted for instance in a pivot bearing 10 and includes a foot pedal P which is operable at a well accessible position between the seat console 5 and the rotary bearing D. The pivot lever H is arranged on the seat console cantilever structure 6.

Figure 3:
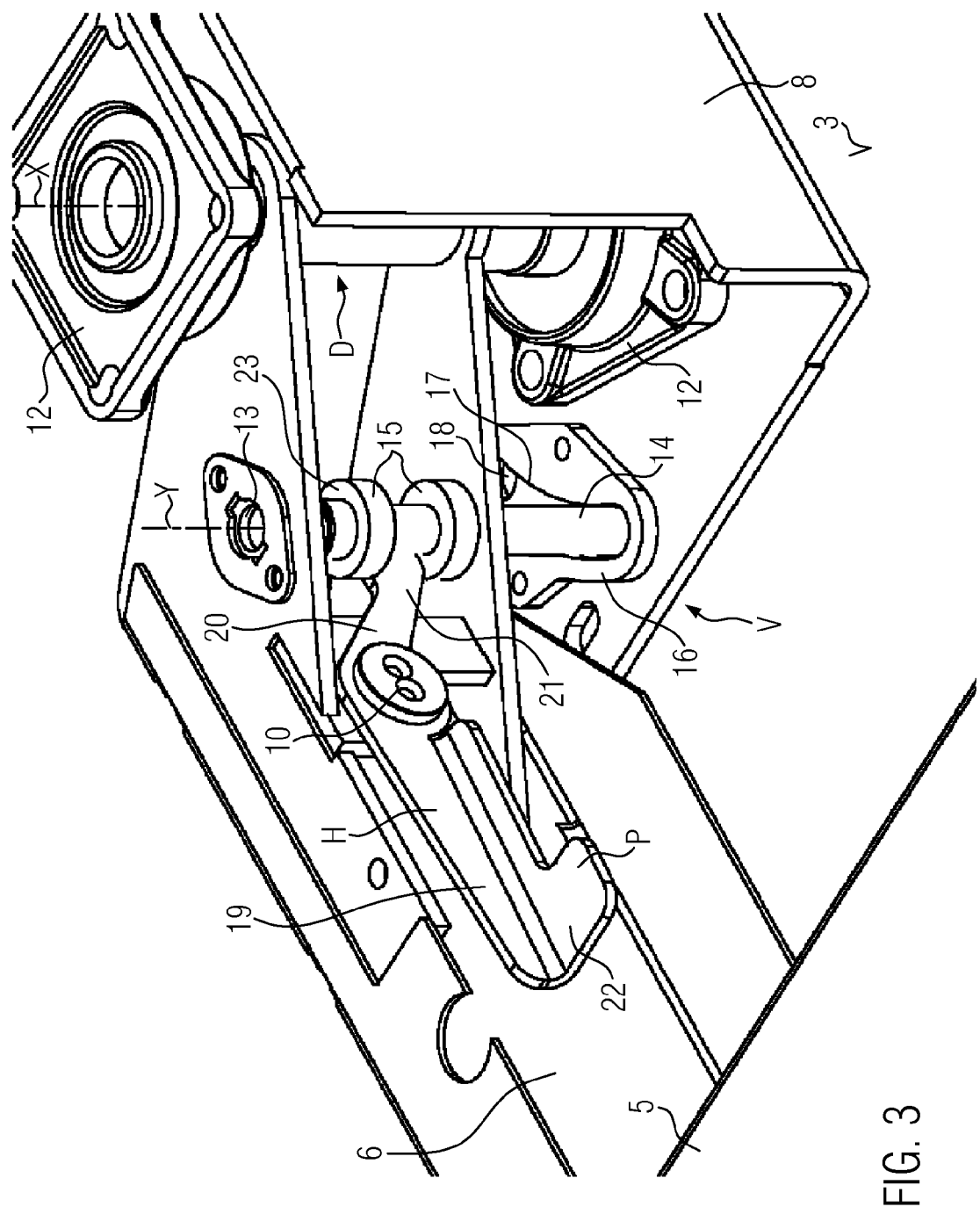
FIG. 3 shows a perspective detailed view (without covers) of a locking device and rotary bearing of a seat console.
Figure 4:
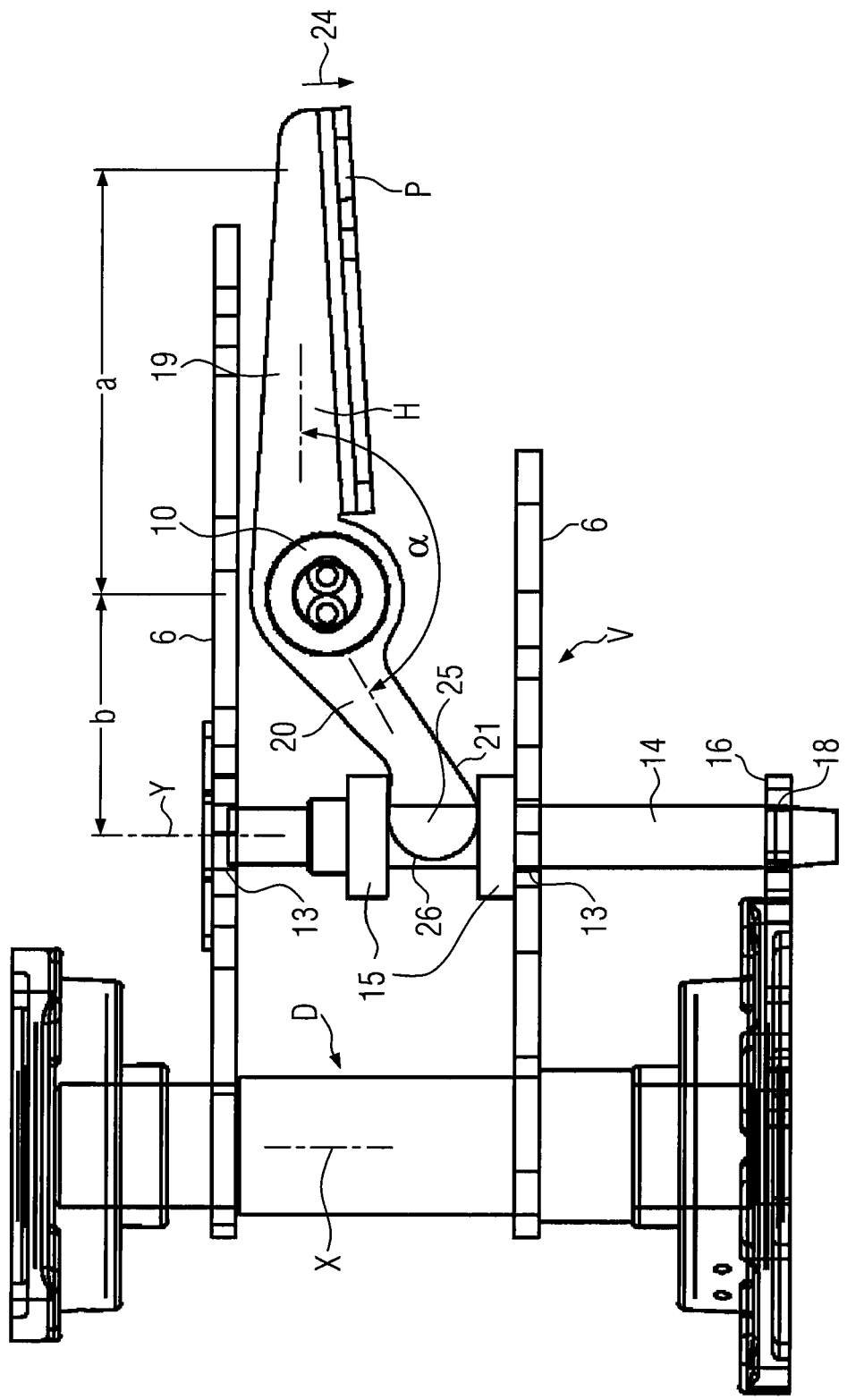
FIG. 4 shows a lateral view of FIG. 3.

In FIGS. 3 and 4 upper and lower bearing blocks 12 of the rotary bearing D can be seen, which are mounted on the partially cut off holder 8 and, thus, stationarily with respect to the operator's stand platform 3. In the seat console cantilever structure 6 slide guides 13 for a lock bolt 14 are provided on upper and lower fixing flanges. The lock bolt 14 can be shifted from the illustrated locked position, in which its lower end positively engages with a locking bolt receptacle 18 (a bore in a sliding block guide 16 with a guiding slot 17), into a non-illustrated disengaged position in the direction of an axis Y, namely by means of the pivot lever H. The lock bolt 14 is provided with at least one stop 15, preferably with two axially spaced apart ring flange stops 15.

The pivot lever H is, for instance, a double-armed lever substantially crank-shaped with an actuating end 19 and a shifting end 20, which may together enclose an obtuse angle a about the pivot bearing 10, wherein the active lever arm a of the actuating end 19 or foot pedal P, respectively, may be longer than an active lever arm b of the shifting end 20. The shifting end 20 of the pivot lever H has an engagement member 25 at the free end thereof which engages with the at least one stop 15 of the lock bolt 14. If the foot pedal P is actuated in the direction of arrow 24 (pushed down) the engagement member 25 engages with the upper stop 15 so as to shift the lock bolt 14 from the illustrated engaged position into the non-illustrated non-engaged position, while the lock bolt 14 is still guided in the slide guides 13. The lock bolt 14 may be preloaded, for instance, by a non-illustrated spring 23 (or the pivot lever H), usefully in the direction of the engaged position. However, if the foot pedal P is lifted opposite to the direction of the arrow 24 the engagement member 25 engages with the lower stop 15 so as to shift the lock bolt 14 from the disengaged position back into the engaged position. Possibly, the lock bolt 14 automatically falls into the new engaged position under its own weight (or by the spring force). The engagement member 25 may be a spoon-shaped widening 21 the outer contour 26 of which follows at least partially a circular arc, which, according to FIG. 3, only acts on one outer side of the lock bolt 14 between the stops 15. Alternatively, a fork structure with two congruent spoon-shaped widenings as engagement members 25 could be provided at the shifting end 20, which then act on both opposing outer sides of the lock bolt 14 between the stops 15. In another non-illustrated alternative the lock bolt 14 could have a recess or a passage with which the engagement member 25 engages.

The pivot lever H with the foot pedal P and the engagement member 25 (the spoon-shaped widening 21) is usefully an integral formed part of sheet steel which is installed on edge (lever plane perpendicular to the axis of the pivot bearing 10) and carries the foot pedal P on an approximately right-angled bend 22 so that the angular cross-section has a great inherent stiffness.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A road finisher comprising:
an operator's stand platform;
a seat console arranged on the operator's stand platform and being adjustable on the operator's stand platform between different, locked working positions;
at least one operator's seat provided on the seat console;
a locking device with a lock bolt provided for the seat console, the lock bolt being shiftable between a disengaged position and an engaged position relative to at least one bolt receptacle defining a respective working position; and
a movably mounted pivot lever for shifting the lock bolt, the pivot lever comprising an actuating end with a foot pedal and a shifting end that is configured to act on the lock bolt;
wherein the pivot lever is double-armed with an obtuse angle between the foot pedal at the actuating end and the shifting end, and the pivot lever is pivotably mounted at a pivot bearing situated between the actuating end and the shifting end;
and wherein the lock bolt is displaceably guided in a shifting direction and comprises two axially spaced apart ring flange stops for the shifting end of the pivot lever, and the pivot lever includes one engagement member that engages an outer side of the lock bolt between the flange stops, or includes a fork structure having two engagement members that engage opposite outer sides of the lock bolt between the flange stops.

2. The road finisher according to claim 1 wherein the foot pedal at the actuating end has an active lever arm with respect to the pivot bearing that is longer than an active lever arm of the shifting end.

3. The road finisher according to claim 1 wherein the pivot lever is an integral formed part of sheet steel, and the actuating end and the shifting end are arranged as flat strip steel arms that define a lever plane perpendicular to an axis of the pivot bearing, and wherein the foot pedal is in the form of a bend approximately right-angled with respect to the lever plane at the actuating end, and the one engagement member or the two engagement members is/are approximately parallel with respect to the lever plane at the shifting end.

4. The road finisher according to claim 3 wherein the one engagement member is formed as a spoon-like widening with an outer contour which partially follows a circular arc, or the two engagement members are formed as two congruent widenings that each partially follow a circular arc.

5. The road finisher according to claim 1 wherein the seat console is adjustable together with a console cantilever structure on the operator's stand platform in a rotary bearing about an axis which is vertical relative to the operator's stand platform.

6. The road finisher of claim 5 further comprising slide guides for the lock bolt that are arranged on the console cantilever structure, and a sliding block guide with lock bolt receptacles designed as bores for the lock bolt that is stationary relative to the operator's stand platform.

7. The road finisher according to claim 6 further comprising a holder that is mounted on the operator's stand platform, wherein the rotary bearing and the sliding block guide are installed in the holder.

8. The road finisher according to claim 1 wherein the pivot lever and/or the lock bolt is/are spring-loaded in a shifting direction toward the engaged position.

9. A seat console assembly for an operator's seat of a road finisher, the assembly comprising:
a seat console that is configured to be pivotably adjustable on a rotary bearing between different, locked working positions;
a locking device associated with the seat console, the locking device including a lock bolt that is shiftable between a disengaged position and an engaged position relative to at least one bolt receptacle defining a respective working position, the lock bolt including at least one stop; and
a pivotably mounted pivot lever for shifting the lock bolt at least from the engaged position into the disengaged position, the pivot lever comprising at least one actuating end with a foot pedal and a shifting end, the shifting end being configured to directly act on the at least one stop of the lock bolt.

10. The road finisher according to claim 5 wherein the console cantilever structure includes two spaced apart slide guides for the lock bolt, and wherein the flange stops are arranged between the slide guides.

11. The road finisher according to claim 1 wherein the pivot bearing defines a pivot axis for the pivot lever, and wherein the pivot bearing and the pivot axis are spaced away from the lock bolt.

12. The road finisher according to claim 1 wherein the lock bolt includes an elongated bolt body, and the flange stops are fixed with respect to the bolt body.

13. The seat console assembly of claim 9 wherein the lock bolt includes two axially spaced apart stops.

14. The seat console assembly of claim 13 wherein the lock bolt includes an elongated bolt body, and the stops are fixed with respect to the bolt body.

15. The seat console assembly of claim 13 further comprising a console cantilever structure that is pivotably adjustable together with the seat console, wherein the console cantilever structure includes two spaced apart slide guides for the lock bolt, and wherein the stops are arranged between the slide guides.

16. The seat console assembly of claim 9 further comprising a pivot bearing at which the pivot lever is pivotably mounted, wherein the pivot bearing defines a pivot axis for the pivot lever, and wherein the pivot bearing and the pivot axis are spaced away from the lock bolt.

\* \* \* \* \*